(12) United States Patent  (10) Patent No.: US 9,833,100 B2
Gaines  (45) Date of Patent: Dec. 5, 2017

(54) PORTABLE FRAMED ARTISTIC WINDOW PANE COVERS

(71) Applicant: Aldolphus Ray Gaines, Washington, DC (US)

(72) Inventor: Aldolphus Ray Gaines, Washington, DC (US)

(73) Assignee: GAINES AND ASSOCIATES, LLC, Washington, DC (US)

( * ) Notice: Subject to any disclaimer, the term of this patent is extended or adjusted under 35 U.S.C. 154(b) by 0 days.

(21) Appl. No.: 14/939,823

(22) Filed: Nov. 12, 2015

(65) Prior Publication Data

US 2016/0130864 A1    May 12, 2016

Related U.S. Application Data

(60) Provisional application No. 62/123,261, filed on Nov. 12, 2014.

(51) Int. Cl.
*E06B 9/24* (2006.01)
*A47H 23/02* (2006.01)
*G02B 5/02* (2006.01)

(52) U.S. Cl.
CPC ....... *A47H 23/02* (2013.01); *A47H 2023/025* (2013.01); *G02B 5/021* (2013.01)

(58) Field of Classification Search
CPC ............... E06B 9/24; E06B 2009/2405; E06B 2009/2447
See application file for complete search history.

(56) References Cited

U.S. PATENT DOCUMENTS

| | | | |
|---|---|---|---|
| 1,370,974 A | 3/1921 | Kirlin | |
| 2,290,180 A | 7/1942 | Hershberger | |
| 3,534,490 A | 7/1968 | Herbert | |
| 3,420,728 A * | 1/1969 | Haverstock | B44F 1/063 156/265 |
| 3,516,893 A * | 6/1970 | Gerard | B32B 27/00 156/277 |
| 5,343,643 A * | 9/1994 | Cochrane | A47G 1/0644 40/732 |
| 6,007,037 A * | 12/1999 | Orozco | A47H 99/00 248/317 |
| 6,022,599 A * | 2/2000 | Rietveld | A47G 1/06 40/718 |
| 6,272,801 B1 * | 8/2001 | Suh | E06B 3/5892 49/505 |
| 6,615,526 B2 * | 9/2003 | Pitcher | G09F 1/12 40/722 |
| 6,919,133 B2 | 7/2005 | Hartig et al. | |
| 7,305,781 B1 * | 12/2007 | Mowry | G09F 3/12 40/124.5 |
| 7,468,203 B2 | 12/2008 | Hicks et al. | |

(Continued)

*Primary Examiner* — Gisele Ford
(74) *Attorney, Agent, or Firm* — Cermak Nakajima & McGowan LLP; Adam J. Cermak

(57) ABSTRACT

A portable framed artistic window pane covers includes plain and textured window pane film mounted on glass or transparent polyvinyl sheet with a prismatic effect that allows incoming light to pass through a window pane while refracting the light at random or semi-random angles in a manner that distorts viewed images through window panes of any size outside a home, office, or structure to create privacy for persons inside home, office, and other structures.

5 Claims, 8 Drawing Sheets

(56) References Cited

U.S. PATENT DOCUMENTS

| | | | | |
|---|---|---|---|---|
| 2002/0162288 A1* | 11/2002 | Kane | ............... | B44C 5/005 |
| | | | | 52/204.59 |
| 2003/0131513 A1* | 7/2003 | Runge | ............... | G09F 7/00 |
| | | | | 40/718 |
| 2003/0198790 A1* | 10/2003 | Bourassa | ............ | B44C 1/105 |
| | | | | 428/195.1 |
| 2004/0071898 A1* | 4/2004 | Trabucco | ............ | B44C 5/00 |
| | | | | 428/13 |
| 2008/0092476 A1* | 4/2008 | Schlabach | ......... | E06B 1/006 |
| | | | | 52/633 |
| 2008/0316381 A1* | 12/2008 | Wu | ............... | E06B 3/6722 |
| | | | | 349/16 |
| 2009/0056247 A1* | 3/2009 | Lin | ............... | B32B 3/14 |
| | | | | 52/204.59 |
| 2010/0126390 A1* | 5/2010 | Burak | ............... | E06B 9/24 |
| | | | | 108/50.11 |
| 2010/0224747 A1* | 9/2010 | Adams | ............ | G09F 7/18 |
| | | | | 248/215 |
| 2011/0076447 A1* | 3/2011 | Lin | ............... | B32B 3/14 |
| | | | | 428/137 |
| 2012/0017480 A1* | 1/2012 | Shtainhorn | ......... | A47G 1/0616 |
| | | | | 40/745 |
| 2014/0139983 A1* | 5/2014 | Suzuki | ............ | G06F 1/1601 |
| | | | | 361/679.01 |

* cited by examiner

PORTABLE FRAMED ARTISTIC WINDOW PANE COVERS

This application claims priority under 35 U.S.C. §119 to U.S. Provisional App. No. 62/123,261, file 12 Nov. 2014, the entirety of which is incorporated by reference herein.

BACKGROUND

Field of Endeavor

The present invention relates to devices, systems, and processes useful as window covers, and more specifically to light-transmitting, artistic, and movable window covers.

Brief Description of the Related Art

Traditional window blinds have inadequacies, whether hung at the top of wall mounted window to drop down or those which can be drawn upwards that, when utilized to reveal interior of structures, permits persons outside of home or other structure to see persons and events inside of homes and structures compromising safety, unauthorized recordings, and exposing personal activities within the home or structure resulting in compromised privacy.

SUMMARY

According to a first aspect of the invention, a portable framed artistic window pane cover comprises a rectangular frame, a transparent or translucent pane positioned in the frame, a translucent film mounted to the pane, the film constructed to refract light passing therethrough, and an attachment device attached to the frame, the attachment device configured to removably hang the frame from an interior portion of a window when positioned adjacent thereto.

Still other aspects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to exemplary embodiments of the apparatus and method, given only by way of example, and with reference to the accompanying drawings, in which.

DETAILED DESCRIPTION OF EXEMPLARY EMBODIMENTS

Figure 1:
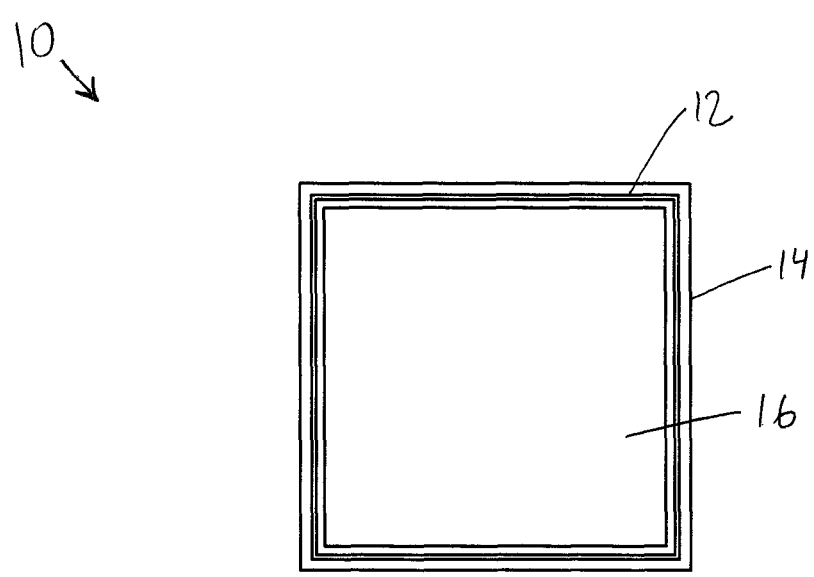
FIG. 1 illustrates a rectangular frame portion of an exemplary embodiment.

Referring to the drawing figures, like reference numerals designate identical or corresponding elements throughout the several figures.

The singular forms "a," "an," and "the" include plural referents unless the context clearly dictates otherwise. Thus, for example, reference to "a solvent" includes reference to one or more of such solvents, and reference to "the dispersant" includes reference to one or more of such dispersants.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited.

For example, a range of 1 to 5 should be interpreted to include not only the explicitly recited limits of 1 and 5, but also to include individual values such as 2, 2.7, 3.6, 4.2, and sub-ranges such as 1-2.5, 1.8-3.2, 2.6-4.9, etc. This interpretation should apply regardless of the breadth of the range or the characteristic being described, and also applies to open-ended ranges reciting only one end point, such as "greater than 25," or "less than 10."

In general terms, pane covers embodying principles of the present invention can resolve inadequacies of adhesive and pressure applied textured films, and window pane treatments which, when applied and affixed to window panes, are not easily nor feasibly able to be removed and reapplied multiple times per day or any frequency, or as needed from wall mounted window panes and glass. Pane covers as described herein can resolve inadequacies of textured films and window pane treatments application requiring water, chemicals, and/or equipment to apply the textured films and window pane treatments directly to wall mounted window panes and glass within home, office, and other structures.

A portable framed artistic window pane cover as described herein includes a plain or textured window pane film and which are light weight to allow easy placement in front of a window pane and be conveniently stored out of site in a closet, basement, and other storage areas when not in use. Pane covers as described herein can be sized to fit any window pane size with a variety of frame sizes. The result is a removable, temporary, or long term visual obstruction to enable persons to (a) experience direct sunlight and/or (b) display during cloudy or nighttime hours while maintaining privacy for the persons inside a home, office, and other structures.

Written and visual expressions embodied on adhesive and pressure applied textured films for adhering to glass or polyvinyl acetal sheet material/transparent polyvinyl sheets are currently commercially available from several sources (e.g., Artscape, Portland, Oreg.; Gila Film Products, St. Louis, Mo.; 3M, St. Paul, Minn.). Pane covers as described herein use a single and/or multi-layer screen process window pane coverings, with written and visual expressions embodied on adhesive and pressure applied textured films for adhering to glass or polyvinyl acetal sheet material/ transparent polyvinyl sheets containing a unitary piece of film configured for attaching to a traditional glass or polyvinyl acetal sheet material/transparent polyvinyl sheets cut to any size or shape. The pane covers are dimensioned to insert into the available space of any size window pane frame or opening in a building structure and further configured for distorting images when viewed from an opposite side of the window pane, and that can be cut to unlimited sizes to fit a wall mounted window.

The films used herein can have a separate discontinuous systematic ordered repeating patterned layer printed with a screen printing process onto a top surface of the film, the screen printing process also blocking the patterned layer from being printed onto other uncovered areas of the top surface of the film leaving those uncovered areas substantially flat and uncovered by the patterned layer; the patterned layer comprising multiple elongated bumps that together form a repeated printed sub-pattern of continuous raised ribs that extend continuously over substantial portions of the top surface film and wherein all of the elongated bumps that together form the raised ribs are each printed directly onto the top surface of the film. The continuous raised ribs formed by the elongated bumps are optionally unevenly spaced apart from adjacent ribs by uncovered asymmetrical flat areas of the top surface of the film that are not covered by the patterned layer. The continuous raised ribs formed by the patterned layer create surface discontinuities on the top surface of the film that form a textured surface over a substantial portion of the film thereby producing a prismatic effect that primarily allows light to pass through the film but in an uneven and non-uniform non-diffusing manner at refracted random or semi-random angles that distort the viewed images with written and visual expressions embodied on adhesive and pressure applied textured films for adhering to glass or polyvinyl acetal sheet material/transparent polyvinyl sheets.

Furthermore, the pane cover's film images optionally include written and visual expressions and thus have unlimited options with stock and custom designs, such as: military logos, emblems, slogans, emblems, etc.; professional sports teams names, logos, players' names and numbers, etc.; college names, acronyms, emblems, sport teams names, logos, players' names and numbers, etc.; college fraternities, sororities, associations, etc.; churches stain glass window pane photos, religious symbols, etc.; personal photos options from human subjects, landscape, sky, water, plants, animals, etc.; personal and professional drawings, artwork, etc.; text messages, advertising, written expressions of thought, etc.; professional organizations names, company names, group and sub-group names, etc.; and other unlimited sources of written and visual expressions.

The pane covers are reversible, allowing the window pane view for image to be readable from the exterior of the building facing public view or readable to occupants within the interior of a structure/building.

The pane covers are secured with locking corner fasteners. Removing the locking corner fasteners permits removing frame borders to insert new/different/alternating written and visual expressions embodied on adhesive and pressure applied textured films.

The pane cover's framing system allows one frame to change and host unlimited single, themed, and groupings of written and visual expressions embodied on different adhesive and pressure applied textured films (i.e., four calendar seasons, calendar holidays emblems/logos, geographical regions landmarks/locations, inspirational and motivational quotes, learning and educational symbols such as alphabets and numbers, etc.) by disassembling and reassembling the frame locking corner fasteners and frame borders. The pane cover's film colors are unlimited throughout the spectrum of options from transparent to black, and have unlimited options to fit small window panes, standard home window panes, to large scale window panes in structures/buildings.

The pane covers are designed to be hung in front of or mounted to a buildings wall mounted window in a manner that matches the size/dimensions of the wall mounted window pane, not the exterior measurements exceeding the dimensions of the window pane, for the purpose to modify/refract and/or reduce light entering the interior of the building to promote privacy with opacity, images, and/or written and/or visual expressions. The pane covers allow sunlight to enter interiors of building without blocking one's view out of the window, while promoting energy efficiency protection from ultraviolet radiation by: reducing unwanted solar heat transferring through your windows; controlling hotspots and sun-drenched areas in buildings; reduce cooling costs; reduces glare from ultraviolet radiation; facilitate natural light during the day while reducing glare on televisions without closing curtains and shades; and provide protection from ultraviolet radiation for your skin, floorings, wall coverings, artwork, photographs, and interior furnishings. The pane covers are designed for use with wall mounted windows, closed to avoid dislodging from a hung/mounted position resulting from a gust of wind that can occur through an open window.

Any of numerous frame constructions can be used in embodiments of pane covers as described herein. Frame constructions with borders which are secured with locking corner fasteners include, but are not limited to, U.S. Pat. No. 3,534,490. Exemplary films include those described in U.S. Pat. Nos. 7,468,203 and 2,290,180.

The polyvinyl acetal sheet material/polyvinyl acetal sheet material/transparent polyvinyl sheets can be of various sizes and thicknesses, as can be the glass window pane. Plates made from glass, mica, or other suitable transparent or translucent material, and the space therebetween may contain a vacuum, air, or gas (wee, e.g., U.S. Pat. No. 1,370,974), and are well known to those of ordinary skill in the art. For energy efficiency protection from ultraviolet radiation, see, e.g., U.S. Pat. No. 6,919,133.

The pane covers allow sunlight to enter interiors of building without blocking the view therethrough, while promoting energy efficiency protection from ultraviolet radiation by: reducing unwanted solar heat transferring through windows; controlling hotspots and sun-drenched areas in buildings; reduce cooling costs; reduces glare from ultraviolet radiation; facilitates natural light during the day while reducing glare on televisions without closing curtains and shades; and provide protection from ultraviolet radiation for person's skin, floorings, wall coverings, artwork, photographs, interior furnishings; etc.

The pane cover is removably and releasably mounted on or to the window. Exemplary embodiments of a device for performing this function include a hangar or metal hook that secures the pane cover to the interior framing of the wall mounted window. Such a hook can be made of plastic or metal or other sturdy material, and be shaped to rest on top of a window section while holding the pane cover in place. Alternatively, a hangar of VELCRO (hook and loop-pile fastener), adhesive, or, e.g., 3M Command Hooks that secures the pane cover to the interior framing of a wall mounted window, can be used. Further optionally, one or more spring-loaded pressure rods, such as commonly used as shower curtain rods, can be positioned between the pane cover and an inner vertical surface of a window casement, and can be either attached to (or form a portion of) the frame of the pane cover, or be entirely separate from the frame; such spring-loaded pressure rods are advantageously adjustable in length, and are well known to those of ordinary skill in the art. Further optionally, such a spring-loaded pressure rod is rotatably mounted in or to the frame, so that the pane cover can be rotated at the rod up and away from the window, e.g., to permit the pane cover to easily pivot in a breeze if the window is left open.

Another exemplary hanger includes two layers of woven fabric of the velvet type in which the loops have been cut to form hooks. The hooks of these layers of fabric are formed by a thread of artificial material, such as nylon or similar materials, so that they are capable of preserving their shape after cutting the loops to form hooks. The preservation of the shape of the hooks is obtained by a thermal treatment appropriate for the particular artificial material used. When two layers of this type are pressed into face to face relation a substantial percentage of the hooks engage with one another, and the two layers are thus hooked one to the other. Separation requires a force of a considerable magnitude when it is attempted to release a large number of hooks at once but separation may be quite readily effected by progressively peeling the layers apart. Hooking or connecting devices of this character are adapted to be used.

Alternatively, a metal wire can be secured to the frame to securely hold the pane cover to the window.

With reference to the drawing figures, an exemplary, yet non-limiting, embodiment is illustrated. FIG. 1 illustrates a rectangular (including, but not limited to, square) frame 10 for use in a pane cover as described herein. The frame 10 includes four straight side portions 12 which are advantageously held together by an encircling elastic encasement 14, described in greater detail elsewhere herein. The frame 10 delimits an open interior space 16 in which a transparent or translucent pane and film are releasably secured.

Figure 2:
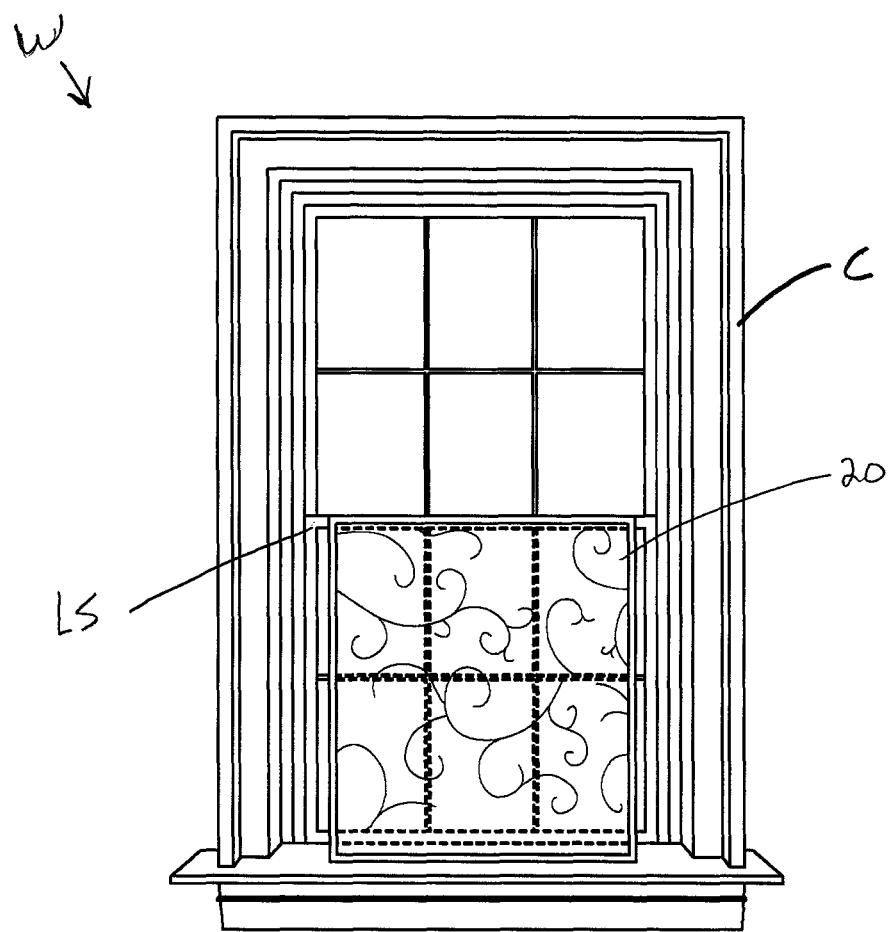
FIG. 2 illustrates a double-hung window and an exemplary pane cover releasably mounted thereto.

FIG. 2 illustrates a standard double-hung window W having a casement which hold the window in an opening in a wall, and at least a lower sash LS. A pane cover 20 embodying principles of the present invention is illustrated being releasably and removably mounted laterally adjacent to the inner surfaces of the panes of the lower sash LS, and includes artistic expressions and a film which distorts light passing through the pane cover sufficiently that images are not readily made out when looking through the pane cover.

Figure 3:
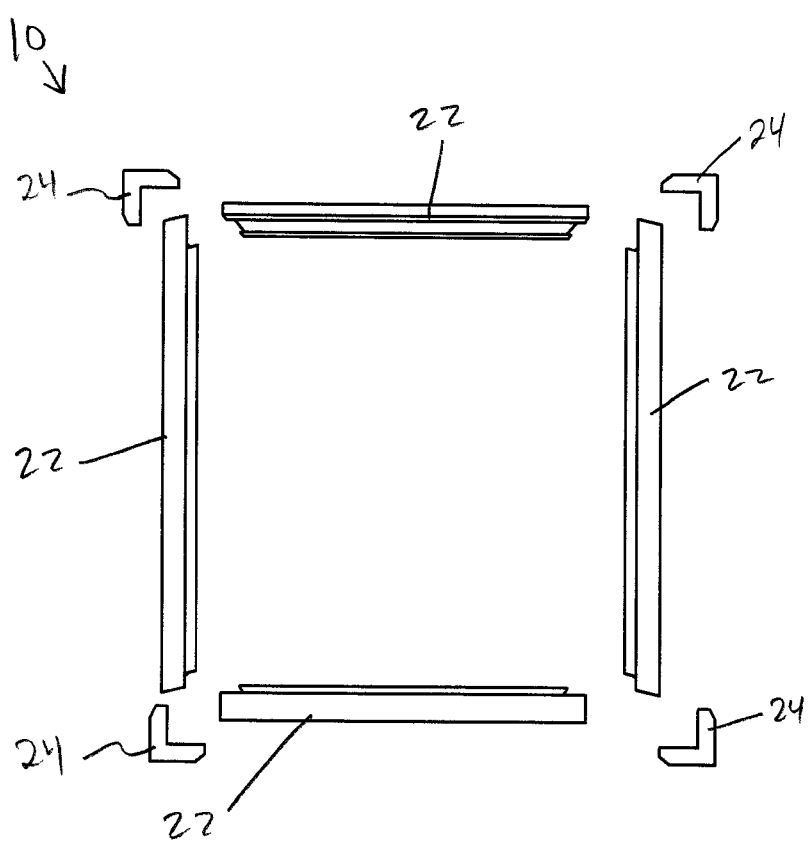
FIG. 3 illustrates an exploded view of the exemplary frame of FIG. 1.

FIG. 3 illustrates an exploded view of an exemplary frame 10; other constructions of frames 10 can be used without departing from the spirit and scope of the present invention. The exemplary frame 10 includes four side rails 22, each connected to two others at respective ends thereof using angle brackets 24. Different from some prior constructions, the angle brackets do not require holes for receiving set screws, as is common for frames, because the encasement described herein holds the entire frame together like a large rubber band around the exterior of all of the rails. This construction, while simple, permits easy removal of the interior pane and film and simply reconstruction of the pane cover 10.

Figure 4:
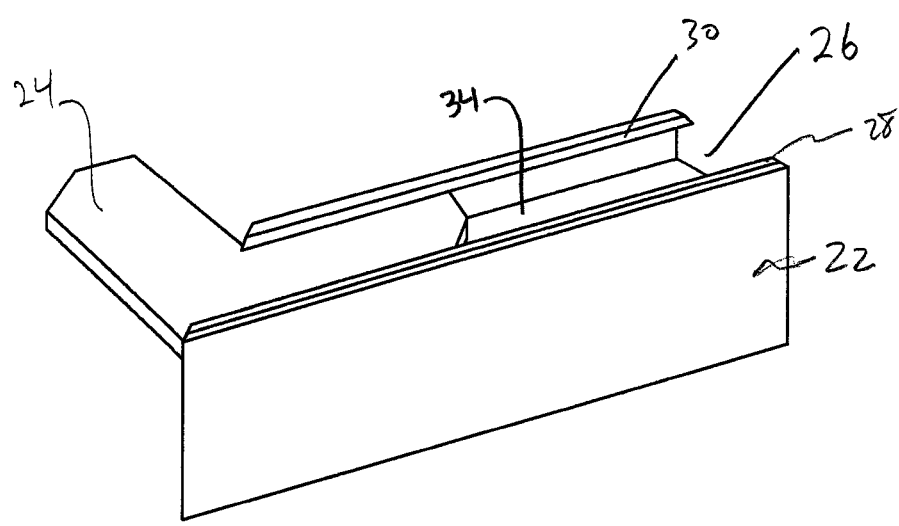
FIG. 4 illustrates an enlarged view of a corner portion of the frame of FIG. 1.
Figure 5:
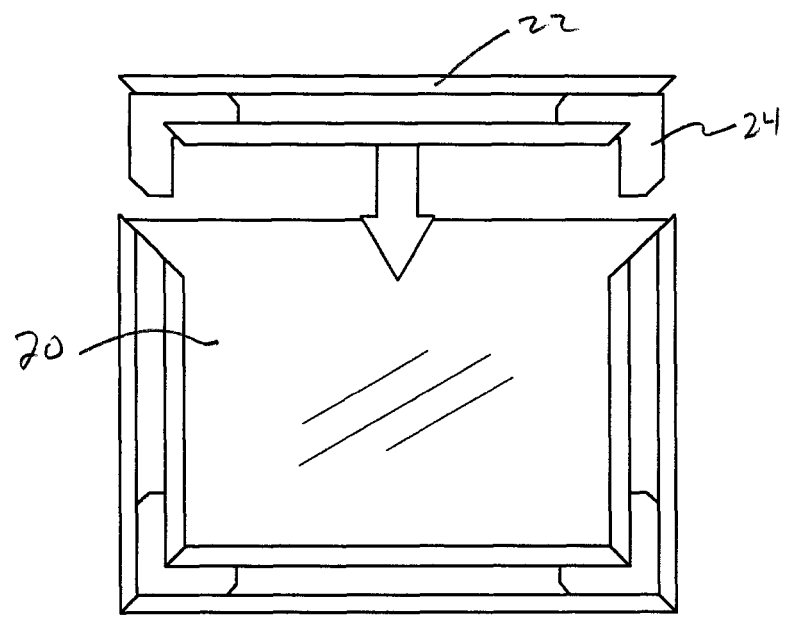
FIG. 5 illustrates assembly of a frame of FIG. 1 with a transparent pane.
Figure 6:
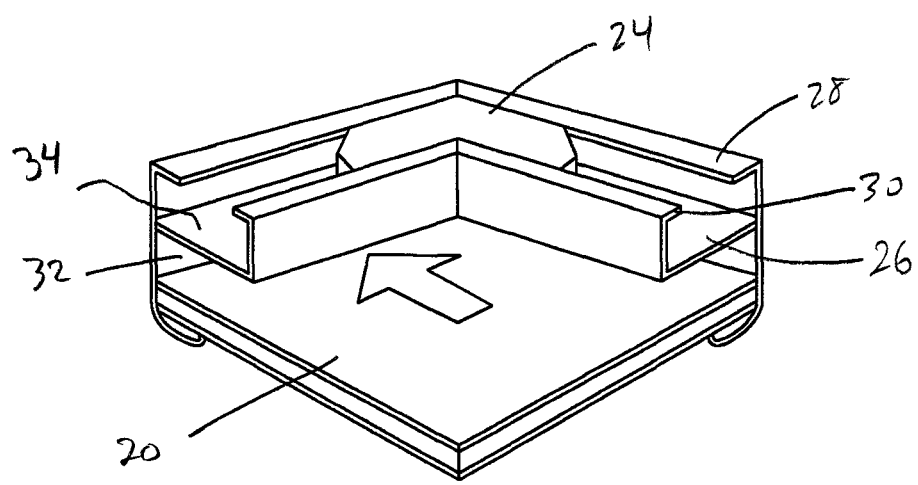
FIG. 6 illustrates an enlarged view of an interior view of the frame of FIG. 5.
Figure 7:
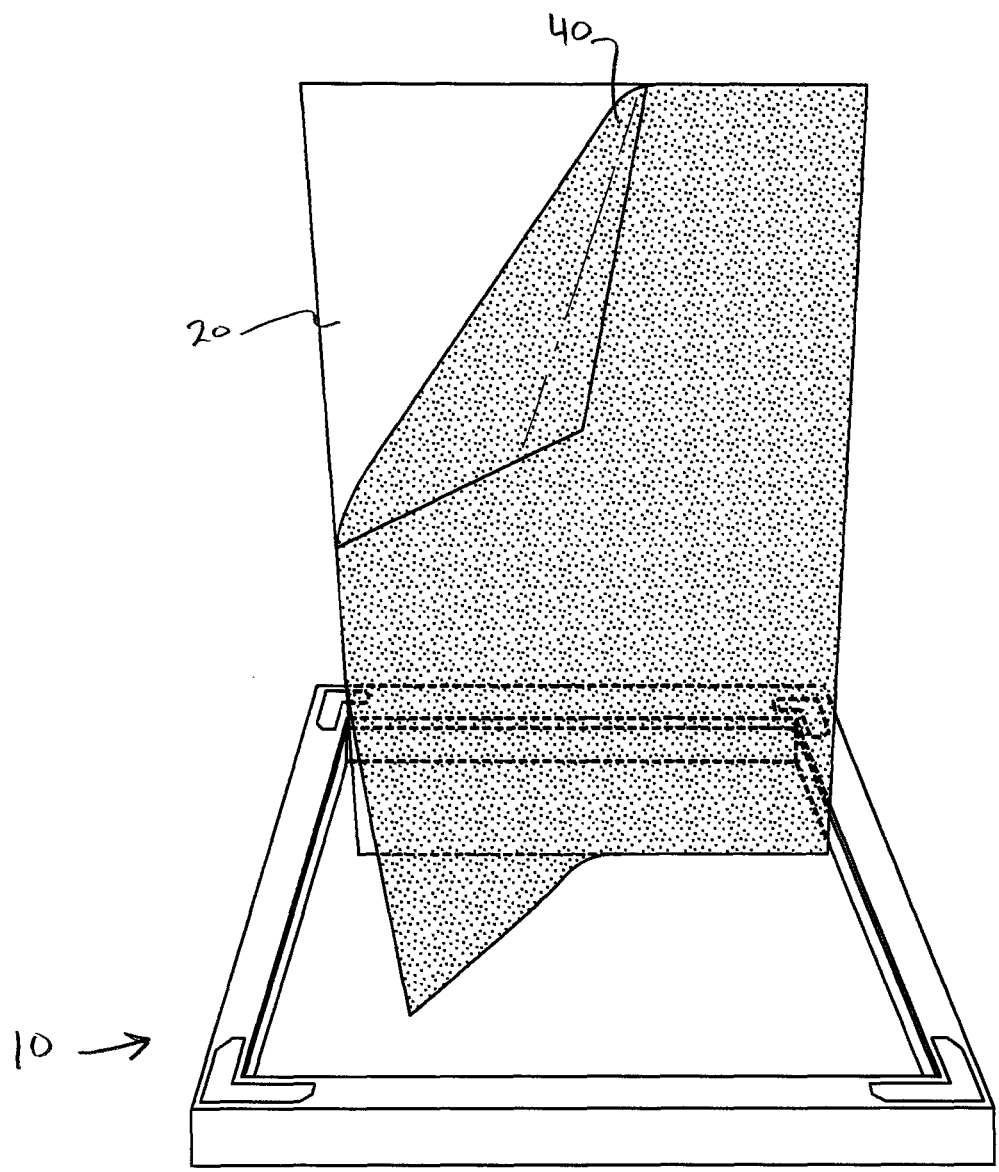
FIG. 7 illustrates the attachment of an exemplary translucent film to a frame of FIG. 5.

FIG. 4 illustrates an enlarged view of a corner of the frame 10. Each rail 22 includes a trough 26 defined by an outer lip 28, an inner lip 30, and a floor 34, at least in the corner thereof, to receive the bracket 24 therein and connect together two adjacent rails. As illustrated in FIGS. 5 and 6, this permits easily sliding together the rails 22, with the corner brackets 23, to secure a transparent or translucent pane 20 in the frame (in a manner well known to those of ordinary skill in the art). As illustrated in FIG. 7, the pane 20 bears a removable and releasable film 40 which refracts light and optionally includes artistic expressions.

Figure 8:
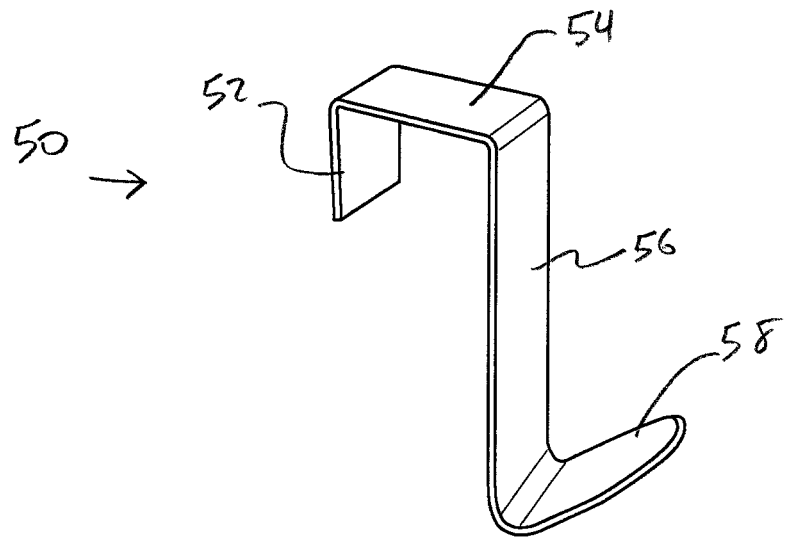
FIG. 8 illustrates a perspective view of an exemplary hanger for a pane cover.
Figure 9:
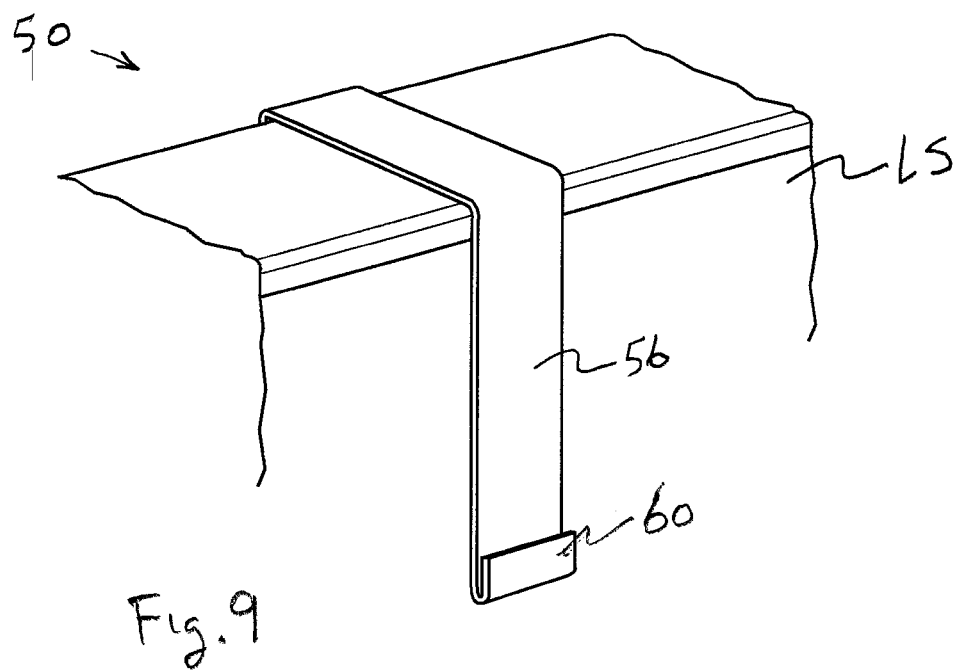
FIG. 9 illustrates a perspective view of another exemplary hanger for a pane cover, with portions of the hanger engaging a window sash.

FIGS. 8 and 9 illustrate exemplary embodiments of hangers useful with a pane cover as described herein. Currently commercially available hangers, such as those used as hangers for office cubicles, can be used. A hanger 50 includes a first straight portion 52 attached to a second straight portion 54 at a right angle bend; the second straight portion is attached to a third straight portion 56 at a right angle bend; and a fourth portion, which acts as a hook, is attached to the third straight portion at a bent portion, which advantageously forms an included angle of less than ninety degrees. The second portion is long enough to fit over the top surface of the lower sash LS of a double-hung window. FIG. 9 illustrates an alternative embodiment in which the fourth portion 60 is bent back at a very tight angle, and can be parallel to the third portion 56, to create a hook. The hook portions of the hangers 50 are advantageously inserted into a portion of the frame 10, e.g., the trough 26, to hang the pane cover from the lower lash LS of a window. Of course, multiple hangers can be used together.

Figure 10:
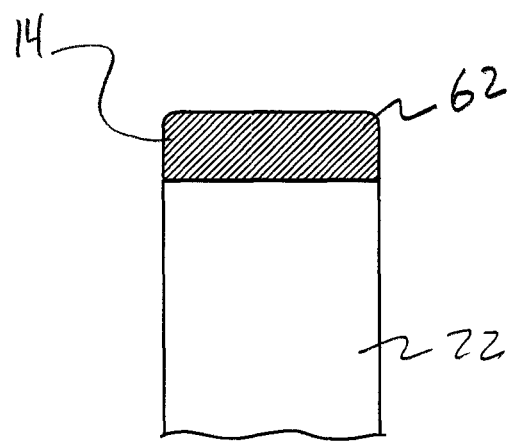
FIG. 10 illustrates a simplified view of an encasement surrounding the exterior of a frame.
Figure 11:
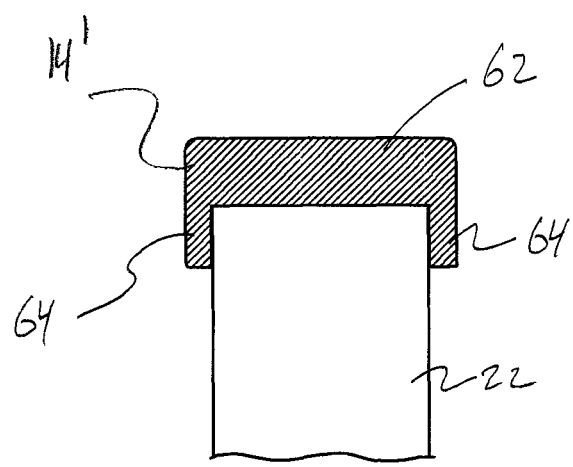
FIG. 11 illustrates a simplified view of another embodiment of an encasement surrounding the exterior of a frame.

FIGS. 10 and 11 illustrate cross-sectional views of exemplary encasements 14, 14' which hold the frame 10 together. The encasement 14 includes a body 62, in this exemplary illustration which has a rectangular cross section, which extends around the entire periphery of the frame 10 and thus holds all of the rails 22 together. In the embodiment of FIG. 11, the encasement 14' includes a body 62 with a rectangular cross section and side portions 64 which wrap around the front and back surfaces of the rails 22, and thus the encasement 14' has a U- or C-shaped cross section, with an interior space which receives each rail 22.

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

I claim:

1. A portable framed artistic window pane cover comprising:
   a rectangular frame;
   a transparent or translucent pane positioned in the frame;
   a translucent film mounted to the pane, the film constructed to refract light passing therethrough such that images are distorted when viewed from an opposite side of the window pane;
   an attachment device attached to the frame, the attachment device configured to removably hang the frame from an interior portion of a window when positioned adjacent thereto; and
   an elastic encasement entirely encircling and holding together the rectangular frame.

2. A pane cover according to claim 1, wherein the attachment device comprises a hook.

3. A pane cover according to claim 1, wherein the encasement has a U-shaped cross-sectional shape.

4. A system for providing privacy, the system comprising:
a window having at least one pane; and
a pane cover according to claim 1 removably attached to the window adjacent to the window pane.

5. A system according to claim 4, wherein:
the window is a double-hung window having a lower sash with an upper surface; and
the pane cover is hung from said lower sash upper surface.

* * * * *